Apr. 10, 1923.

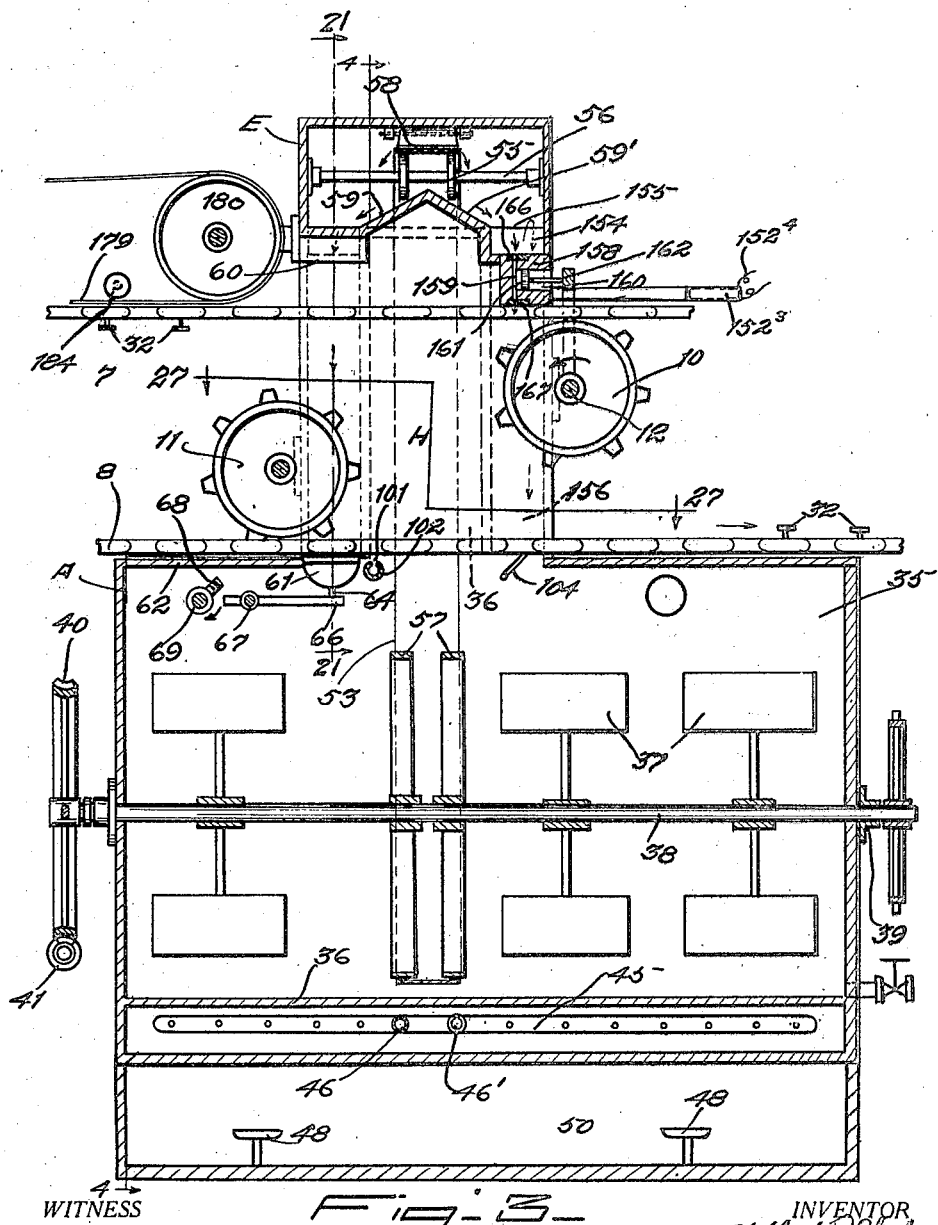

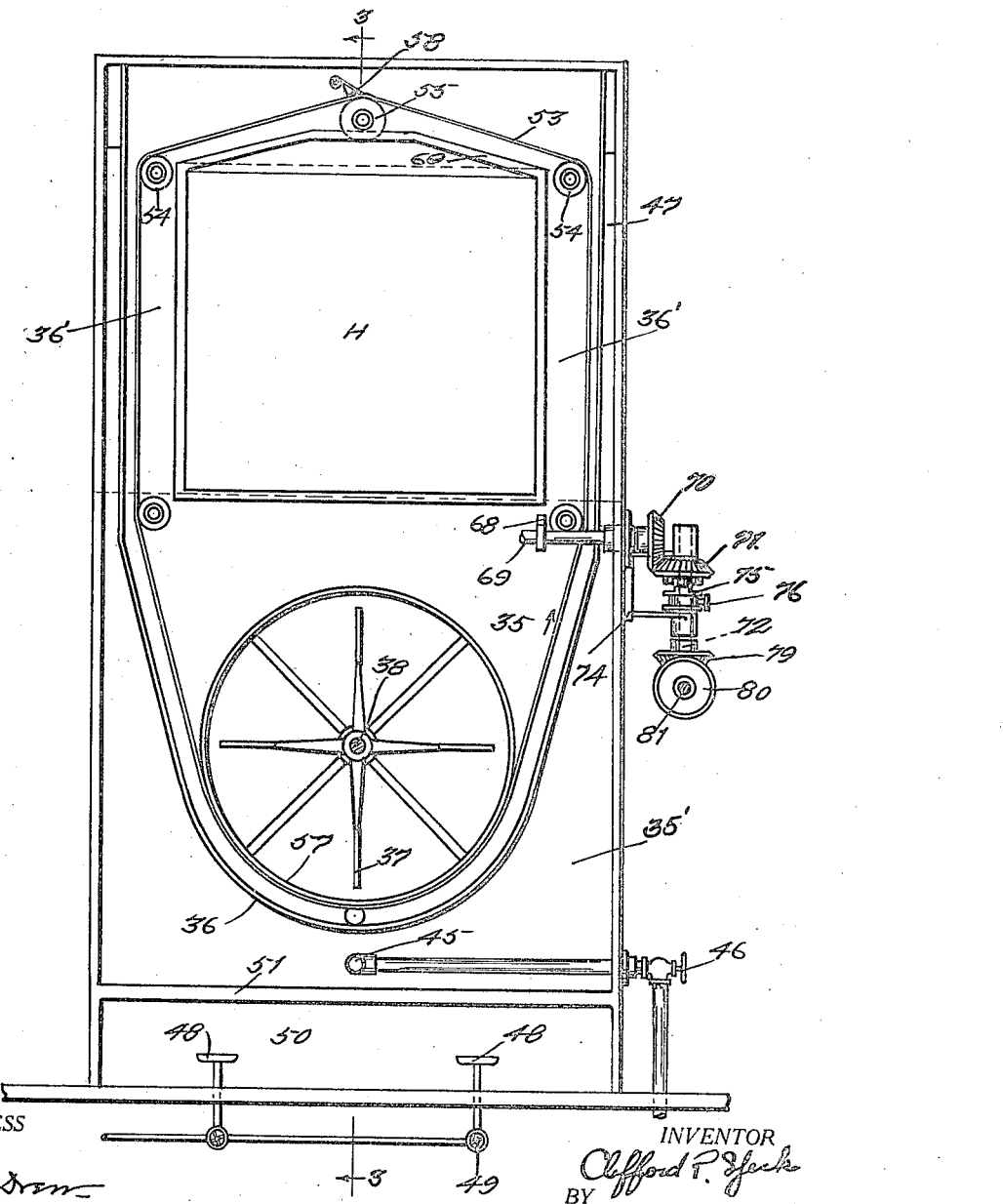

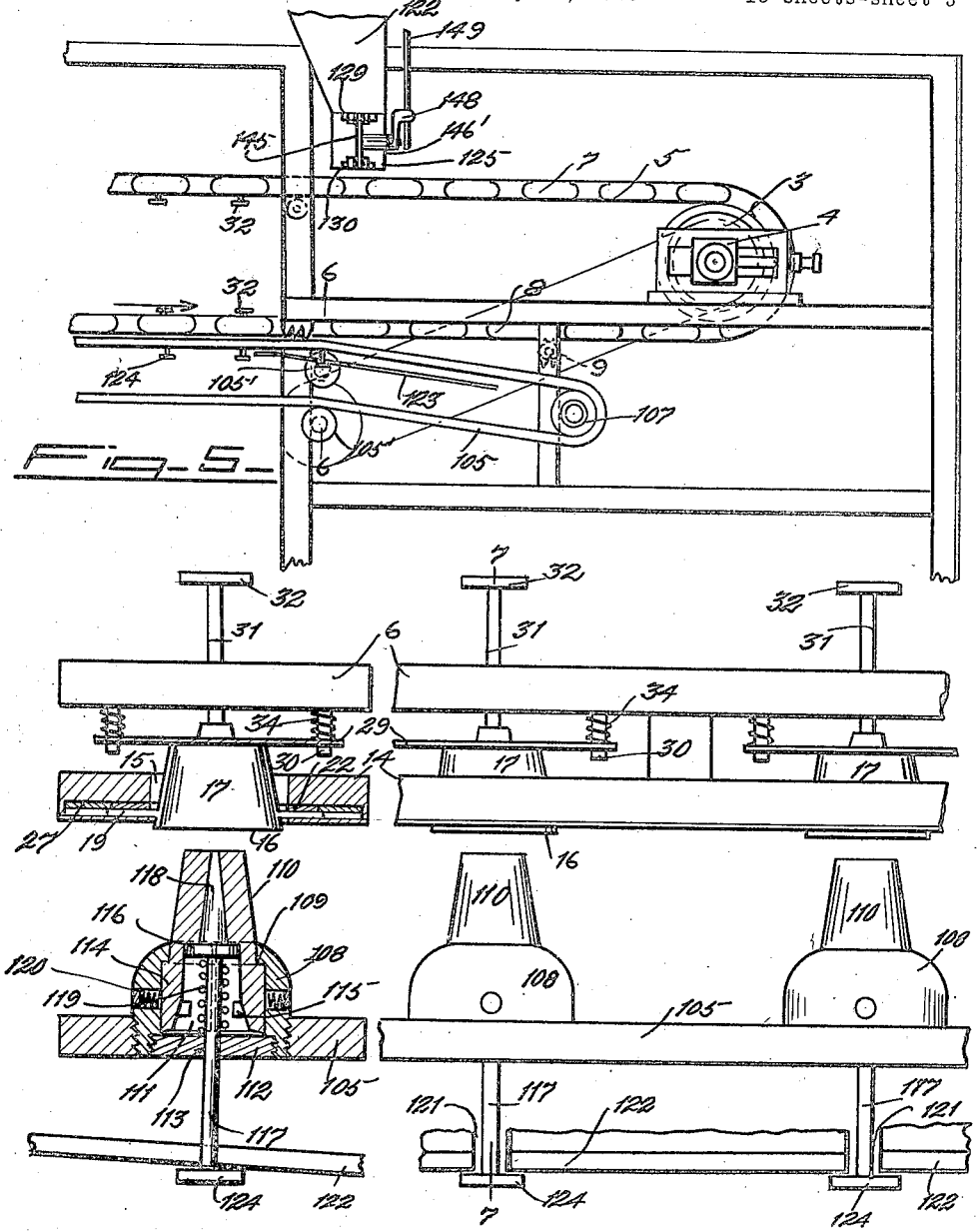

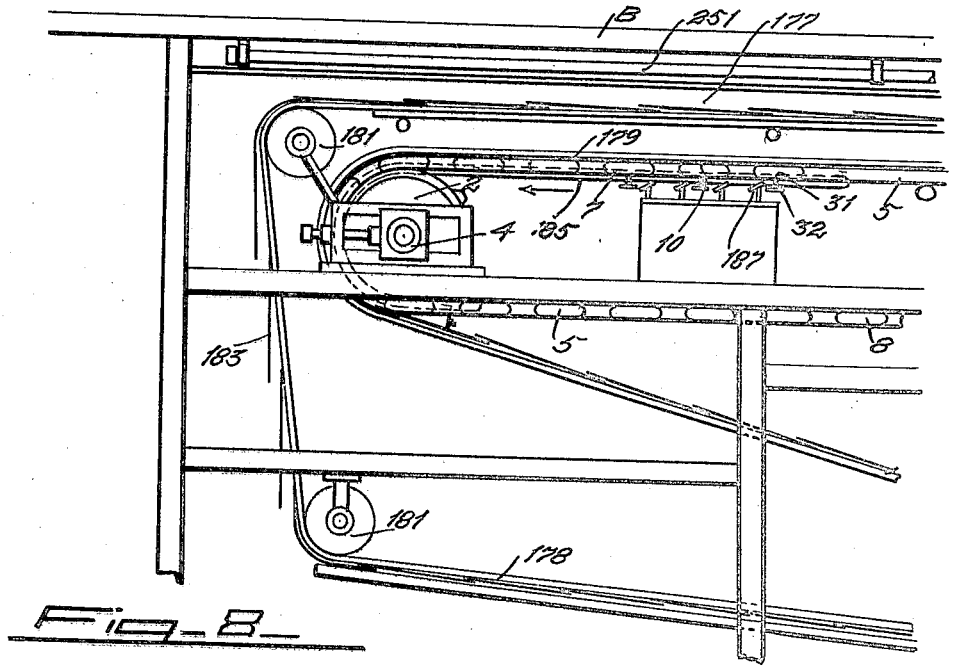
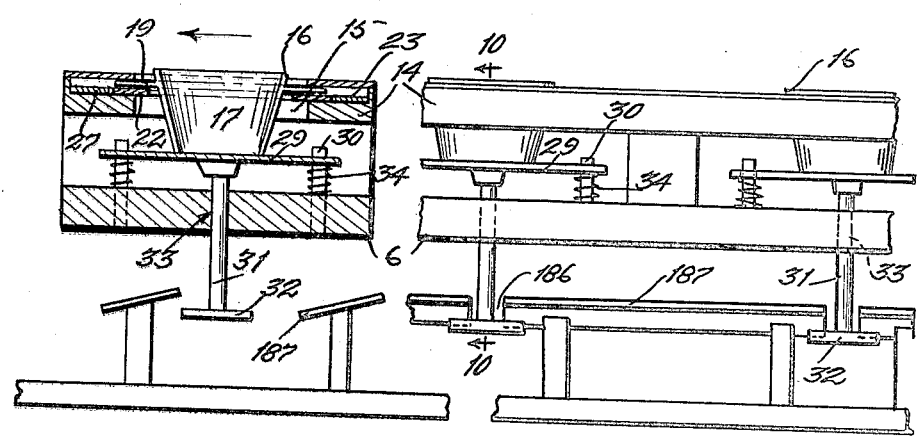

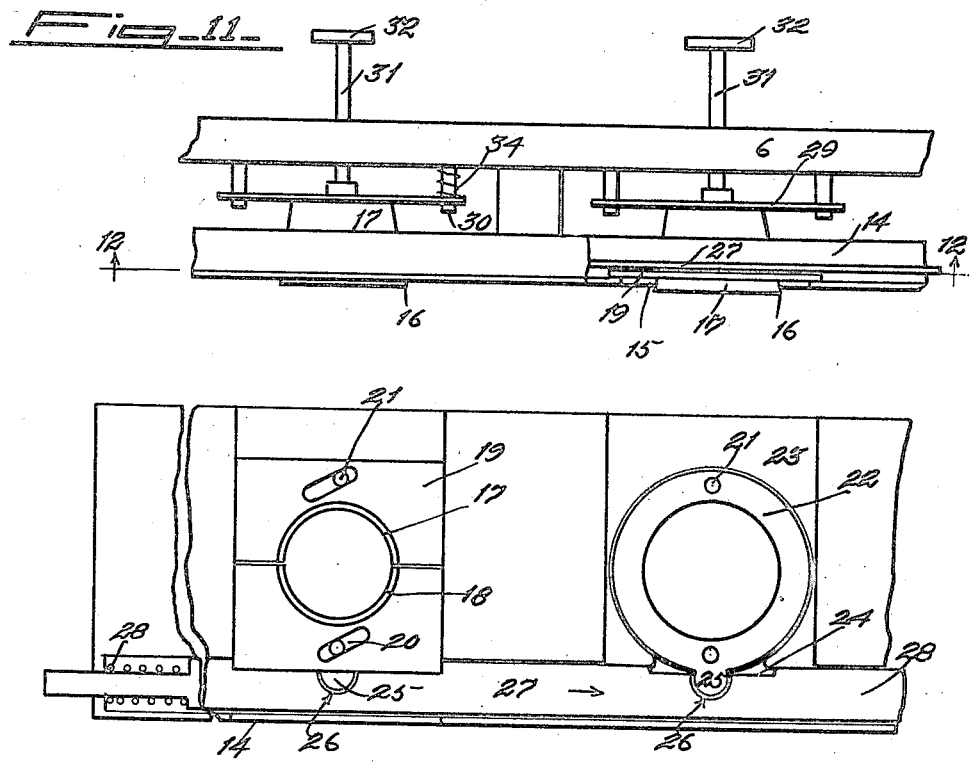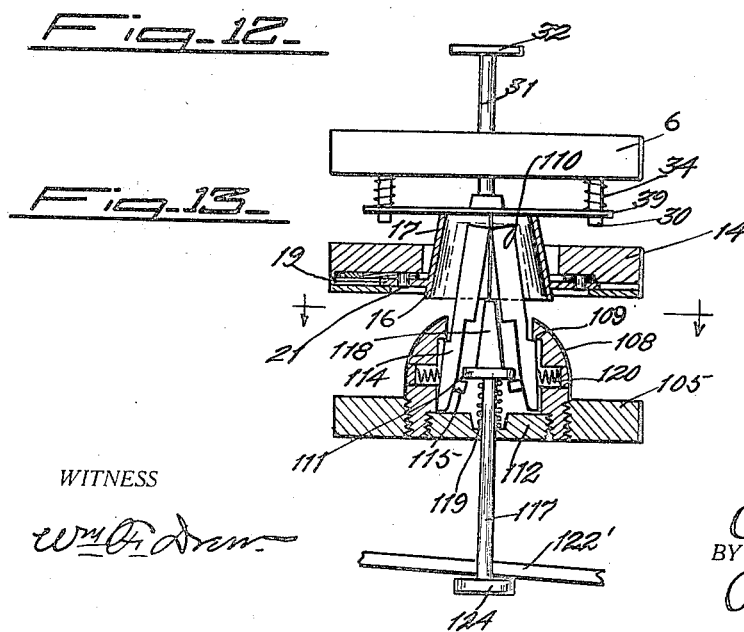

C. P. SPECK 1,451,031

CONFECTION MAKING APPARATUS

Filed May 17, 1920   13 sheets-sheet 8

WITNESS

Wm F. Drew

INVENTOR
Clifford P. Speck
BY
Cushman & Totten
ATTORNEYS

Apr. 10, 1923.
C. P. SPECK
1,451,031
CONFECTION MAKING APPARATUS
Filed May 17, 1920     13 sheets-sheet 9
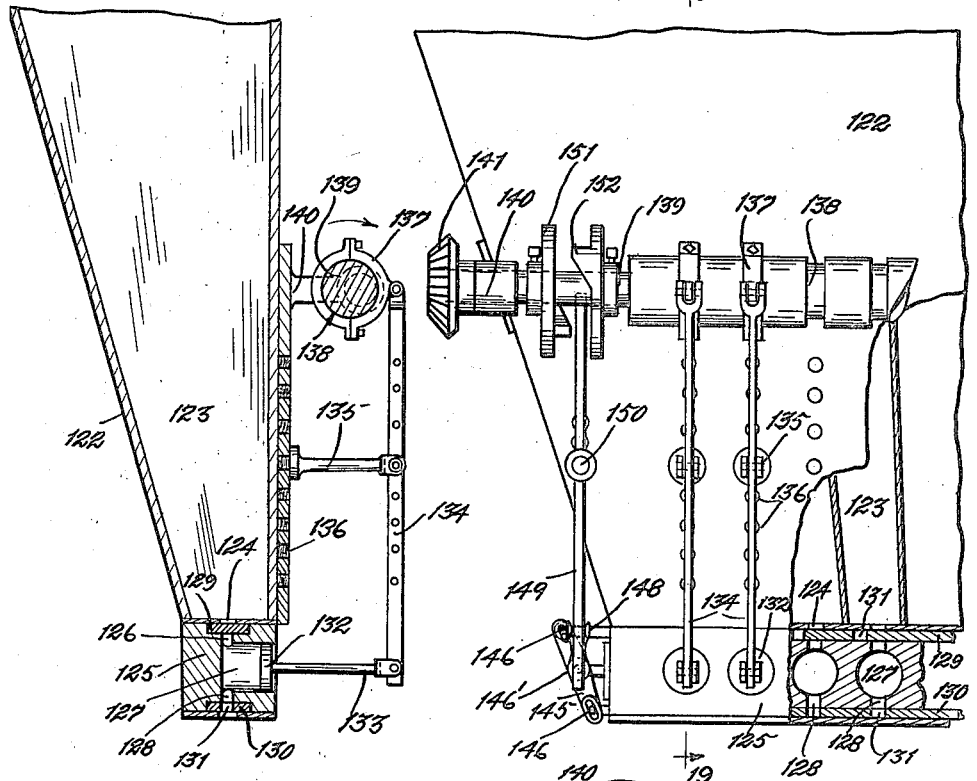

Apr. 10, 1923.
C. P. SPECK
1,451,031
CONFECTION MAKING APPARATUS
Filed May 17, 1920 13 sheets-sheet 10
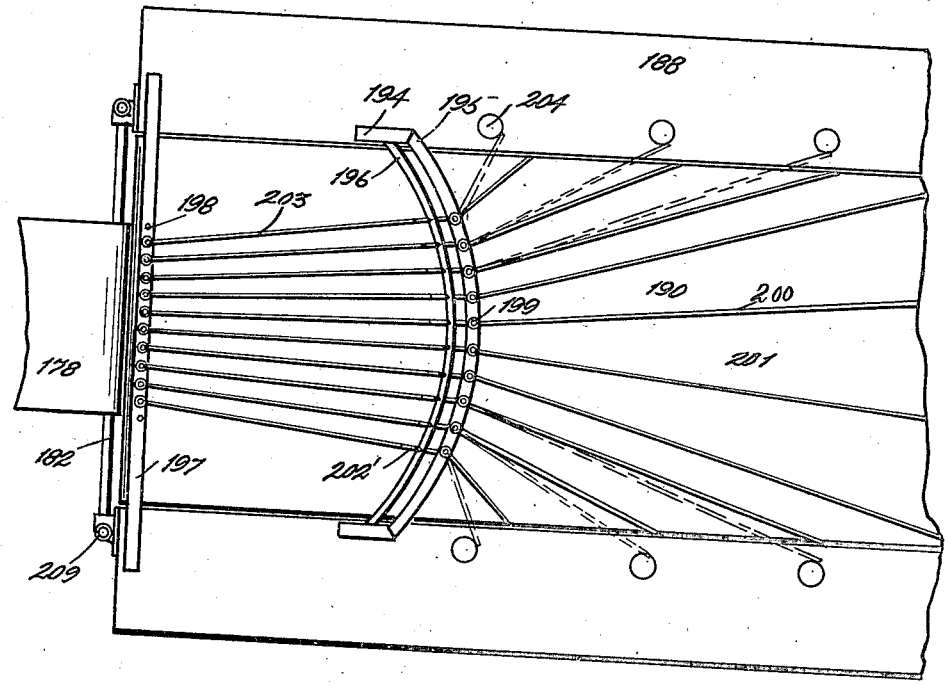
Fig. 22
Fig. 21
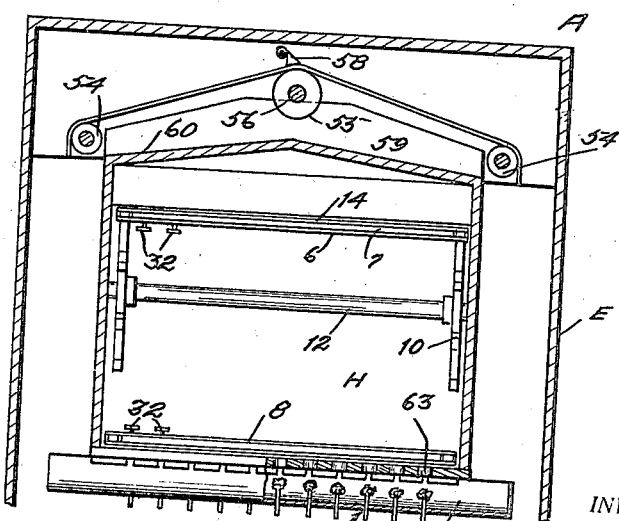
WITNESS
INVENTOR
BY
ATTORNEYS

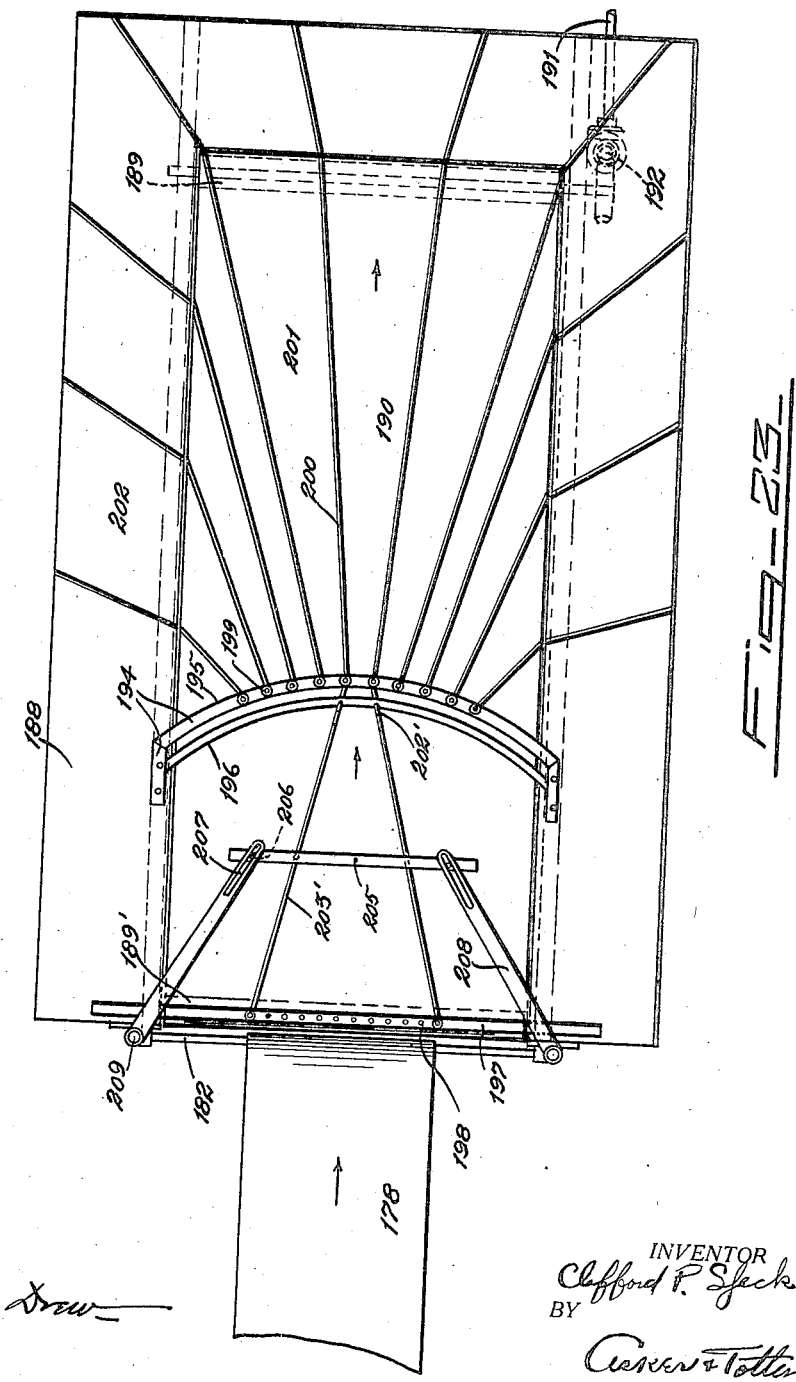

Apr. 10, 1923.

C. P. SPECK 1,451,031

CONFECTION MAKING APPARATUS

Filed May 17, 1920

WITNESS

INVENTOR
Clifford P. Speck
BY
ATTORNEYS

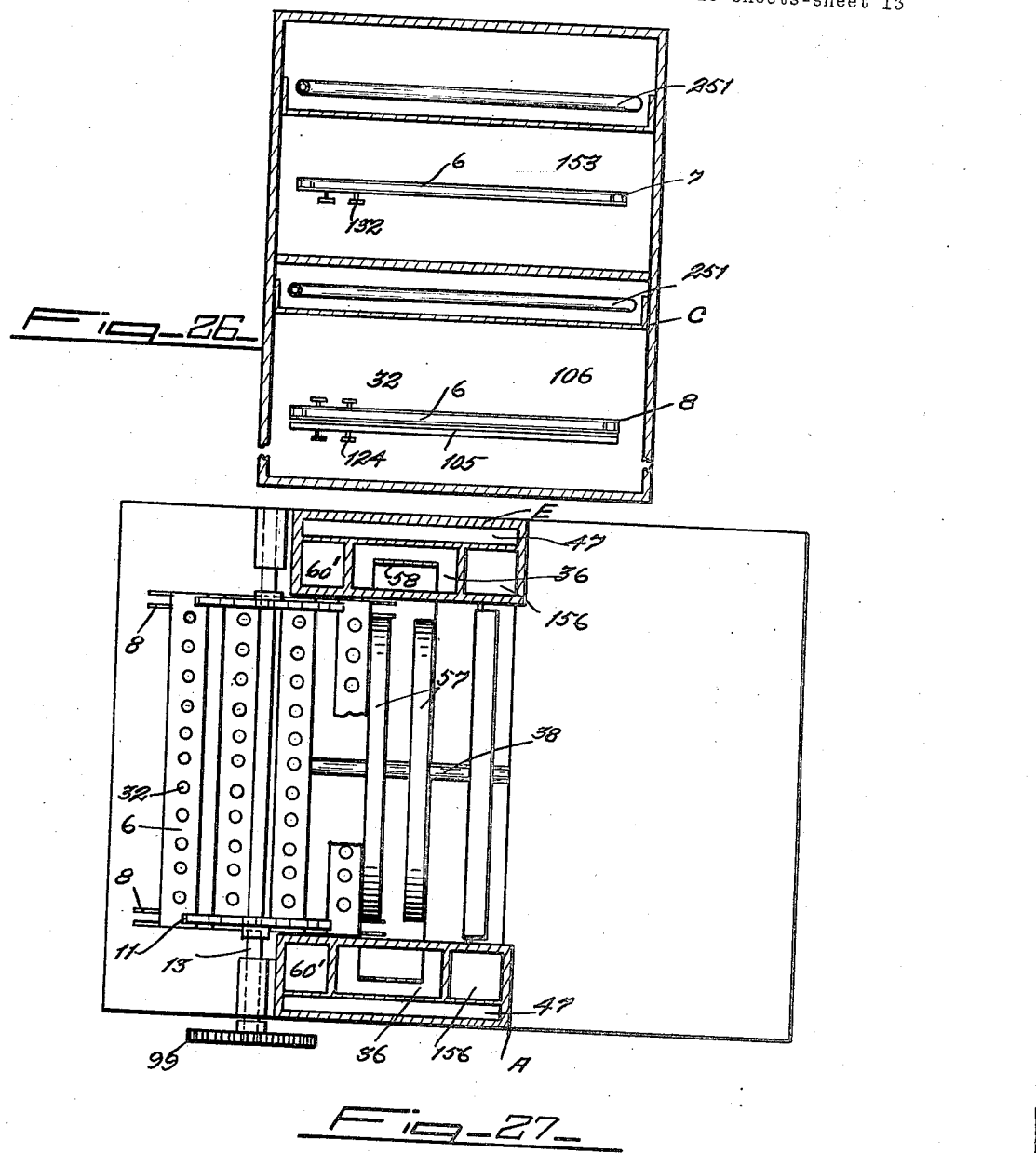

Patented Apr. 10, 1923.

1,451,031

UNITED STATES PATENT OFFICE.

CLIFFORD P. SPECK, OF OAKLAND, CALIFORNIA.

CONFECTION-MAKING APPARATUS.

Application filed May 17, 1920. Serial No. 381,849.

*To all whom it may concern:*

Be it known that I, CLIFFORD P. SPECK, a citizen of the United States, residing at Oakland, in the county of Alameda and State of California, have invented certain new and useful Improvements in Confection-Making Apparatus, of which the following is a specification.

In the making of candy at present, particularly in the manufacture of what is commonly termed chocolate covered, or cream covered, or cast in starch goods, it is customary to first make in starch filled trays, forms or impressions therein and fill these impressions with the material to be used as the center for the finished product. It is necessary before using this center to let the same set, to enable the starch form to be broken therefrom, after which time the starch used is retreated and used in subsequent forms. The formed center thus made is afterwards coated by one of several different processes, the most common being what is known as the dipping process, wherein operators, through hand movement, or by machine, apply a coating to the exterior of the center.

This present method of manufacturing candy requires for any great production a considerable investment in starch, starch trays, dipping tables, hot rooms, starch bucks, printer-machines, dipping machines, and decorating machines; requires considerable time to complete any one given batch of candy and necessitates the employment of a number of operators to carry on the work.

The present invention relates to an apparatus whereby confections are capable of being manufactured in a continuous operation without the requirement of starch, starch trays, dipping tables, hot rooms, starch bucks, printer-machines, hand dipping or dipping machines, or decorating machines, and without the necessity of delaying the completion of the goods while the centers dry or set.

The principal object of the present invention is to provide a machine wherein the shell, more commonly known as the outside coatings, are formed in a predetermined size, shape and thickness, in a suitable mold, and containing a chamber or recess for receiving the center or filler, one wherein the molds both before receiving the coating and with the coating therein, are maintained under the required temperature to obtain the best results in the finished product.

A further object is to provide a machine by the use of which a determinable quantity and kind of center or filler is supplied to each shell; one having means for closing the shell after the center or filler is supplied thereto; one wherein the finished articles are capable of being deposited on a suitable distributor, whereby the same may be packed or sorted as to kind, quantity, grade, design or flavor.

Other objects are to provide means associated with the molds for discharging therefrom the filled and finished article and to provide in the machine means for maintaining the material, both before and after delivering the same to the mold, under the required temperature for the most successful results.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention reference is directed to the accompanying drawings, wherein:—

Figure 3 is a sectional view through the apparatus illustrated in the center of Figure 1 and also in Figure 2, disclosing the coating container, the coating elevator, mixers and temperature maintaining apparatus.

Figure 4 is a vertical sectional view taken on line 4—4 of Figure 3, disclosing more fully the temperature controlling means, the coating elevator and the double flight mold conveyer.

Figure 5 is an enlarged view in detail of one end of the apparatus at a point where the fondant is supplied to the lined molds.

Figure 6 is a view in detail of a pair of molds with their associated plungers taken on line 6—6 of Figure 5.

Figure 7 is a vertical sectional view taken through one of the pairs of molds on line 7—7 of Figure 6.

Figure 8 is an enlarged view in detail of the opposite end of the apparatus from that illustrated in Figure 5, illustrating more particularly the conveyer on which the finished confections are deposited from the molds.

Figure 9 is a view in elevation of the molds in their inverted position, and illustrating the operating means for the mold content discharge plungers.

Figure 10 is a vertical sectional view of one of the molds illustrated in Figure 9, taken on line 10—10 of Figure 9.

Figure 11 is a view in broken side elevation of one of the conveyer bars, illustrating a pair of molds therein and the mold section operating means for one set of molds.

Figure 12 is a longitudinal sectional view of the broken bar illustrated in Figure 11, taken on line 12—12 of Figure 11.

Figure 13 is a view in vertical section of one of the molds and its associated content forming core received therein and in collapsed position.

Figure 18 is an enlarged view in front elevation partly in section of the fondant reservoir illustrated in Figures 1 and 5.

Figure 19 is a vertical sectional view taken on line 19—19 of Figure 18.

Figure 20 is a view in end elevation of the construction illustrated in Figure 18.

Figure 21 is a vertical sectional view taken on line 21—21 of Figure 3 of the drawings.

Figure 22 is a view in plan of one form of distributing table, whereby the confection discharged from each mold is delivered to a separate packer.

Figure 23 is a view in plan of a distributing table wherein means are provided for directing the finished confections from one set of molds to any desired packer.

Figure 26 is a section taken on line 26—26 Figure 1.

Figure 27 is a section taken on line 27—27 Figure 3.

Figure 1:
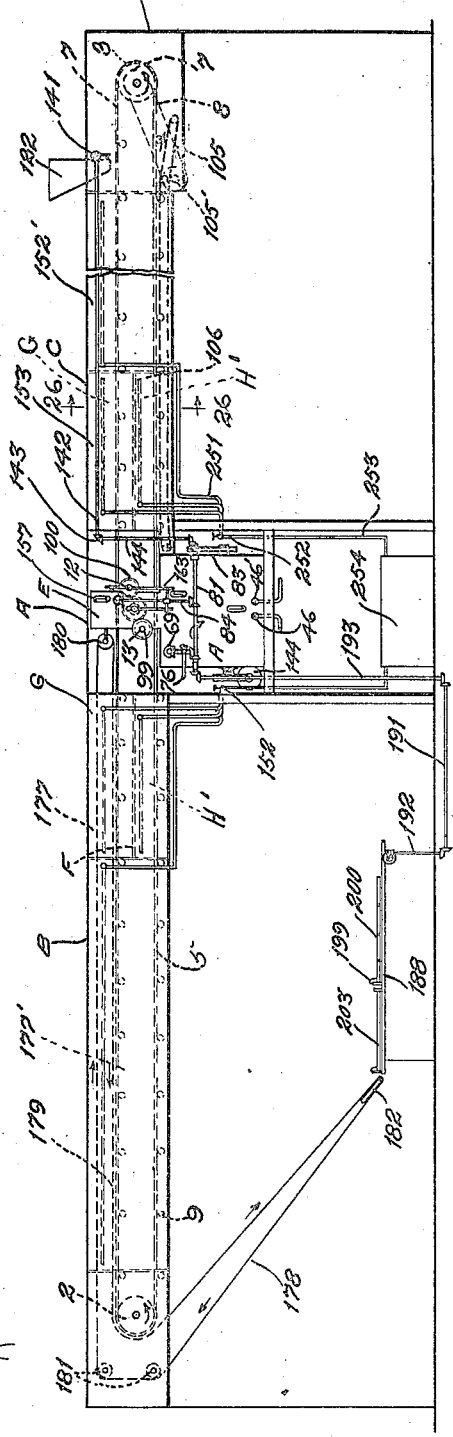
Figure 1 is a view in front elevation of the preferred embodiment of my invention with the parts assembled and in operative position.

The numeral 1 indicates a housing for the apparatus consisting of the main central section A and laterally disposed wing sections B and C tubular in form and preferably rectangular in cross section. The central section A consists of a base D and a reduced portion E, Figure 2 of the drawings, and said wing sections B and C are disposed preferably in line, and at opposite sides of this reduced upper portion E of the central section A. The inner ends of the sections B and C adjacent the reduced portion E of the central section A are each divided by a horizontal partition F into upper and lower cooling chambers G and H' illustrated in Figure 1 of the drawings.

In the present apparatus, the confection or candy is molded in several stages and the molds are preferably constructed to operate in the following manner. Rotatably mounted adjacent the extreme outer ends of the wings B and C are suitable sprocket wheels 2 and 3, Figures 1, 5 and 8 of the drawings, carried in adjustable bearings 4, and around said sprockets pass the endless conveyer side chains 5 of any well known link type. The conveyer chains are connected at intervals throughout their length by the transversely extending parallel spaced mold support bars 6, Figures 6, 7, 14 and 16 of the drawings; thus the chains 5 and bars 6 form a complete conveyer supported at opposite ends by the sprockets 2 and 3 which divide the conveyor into upper and lower flights 7 and 8. The upper flight 7 passing through the upper cooling chambers in the wings B and C, and the lower flight passing through the lower cooling chambers in the wings B and C, as in Figure 1 of the drawings. At the point of the passing of the conveyer flights 7 and 8 transversely through the reduced upper portion E of the main central section A, said section is provided with a suitable chamber or passage H extending transversely therethrough in line with the adjacent ends of the tubular wings B and C, as in Figures 1, 3 and 21 of the drawings. The flights 7 and 8 intermediate the sprockets 2 and 3 are supported and prevented from sagging by suitable slides or idler or supporting rolls 9 and said conveyer flights are operated in the direction of the arrows, Figures 1, 3, 5 and 8 of the drawings, by the sprocket wheels 10 and 11 associated with the reduced portion E of the central section A. The sprockets 10 being carried by the shaft 12 and engaging with the chain links of the upper flight 7 and the sprockets 11 being supported on the rotatable shaft 13 and engaging with the lower flight 8, and said sprockets are intermittently rotated to impart a step motion to the conveyer by a hereinafter described mechanism.

Extending parallel with the outer face of each bar 6 is a suitable mold support 14 formed at spaced intervals throughout its length with suitable mold receiving apertures 15, and in each of said apertures is positioned a mold, the preferred form thereof being illustrated in Figures 6, 7, 9, 10, 11 and 12 of the drawings. The molds each consist preferably of the conical open ended cups 16 divided vertically preferably into the two halves 17 and 18, and from each half section adjacent the peripheral edge of the cup extends a laterally disposed supporting plate 19, Figures 7, 8 and 12 of the drawings, and each of said plates is provided with a diagonal slot 20, and into each of which extends a pin 21 carried by a suitable mold section opening and closing ring 22. The inner opening of the ring 22 is of a diameter slightly larger than the exterior diameter of the cup 16 adjacent the inner face of the flange 19, and said ring is received in a depression in the member 14 surrounding the opening 15, and in said depression is a plate 23 having a circular opening within which the ring is axially rotatable. The plate 23 is formed with an opening 24 at one side, through which projects a tongue 25 extending laterally from one face of the ring 22. The tongues 25 associated with the respective rings 22 of the molds of any given bar are received in depressions or notches 26 in a common mold actuating bar 27 disposed longitudinally of the member 14, as in Figures 7, 11 and 12 of the drawings. The mold actuating bar 27 of the preferred form of mold extends a short distance beyond one end of the member 14 for contacting at a certain portion of the travel of the molds within the lateral wing B, with a mold release bar 185, Figure 8 of the drawings. The movement of the member 27 in the direction of the arrow, Figure 12 of the drawings, on the contact of the end of the member with the release bar 28 imparts a slight rotative movement to all the rings 22 associated with the molds of any given support 14, causing the pins 21 to move within the slots 20 and separate the section 17 and 18 forming the respective cups or molds 16.

On the release of pressure on the end of the member 27, the coiled spring 28 associated with the members 27 move the same in a direction reverse to the arrow Figure 12 of the drawings, forcing the mold sections 17 and 18 together, as in Figure 12 of the drawings. To close the inner open end of each cup or mold 16, I prefer to position a closure plate 29 adjacent the inner open end of each mold or cup between the members 6 and 14, Figures 6, 7, 9, 10, 11 and 12 of the drawings. The closure plates 29 are disposed in a horizontal plane, and are rectangularly movable to and from the inner end of the cup 16 on guide pins 30 extending inwardly from the bar 6. From the center of each closure plate 29 extends rearwardly an operating stem 31, having an enlarged head 32, the same reciprocating through a guide opening 33 in the bar 6. Each plate 29 is normally maintained in contact with the inner open end of its associated cup 16 by the coiled springs 34 coiled about the respective guide pins 30.

It will thus be apparent that by forming the cup 16 in a number of separable sections and providing means whereby all the sections of the cups or any given bar may be simultaneously separated, the confection formed in the respective cups of any given bar are capable of being simultaneously discharged from their associated cups, and by providing the closure plate for the inner ends of the respective cups any suitable ornamentation may be provided for the upper side or top portion of the confection, but at the same time the operation of the plates in a hereinafter described manner will assist in jarring the confection loose from the mold when it is so desired.

By my present apparatus, I first form in the molds or cups 16 when making filled confection, the outer shell which is preferably of chocolate, and this is supplied to the mold when the mold is in a position with the enlarged open end thereof downwardly disposed, as in Figures 6, 7 and 13 of the drawings, the molds then being associated with the lower flight 8 of the conveyer at a point adjacent the reduced portion E of the main section A. The chocolate or mold forming material is supplied to the molds by the following mechanism:— The base or enlarged portion D of the central section A is provided with a containing chamber 35, Figure 3 of the drawings, the chamber having a rounded lower end 36 and extending the full length of the base D, Figure 3 of the drawings. The upper portion of the chamber 35 which contains the shell forming material, chocolate or coating communicates with the upper reduced portion E of the section A through vertical channels 36' located one at each side of the transverse passage 4 extending through the reduced portion E, as in Figures 4, 21 and 27 of the drawings. Shell forming material or chocolate coating is supplied to the container 35 in any suitable manner and is preferably maintained therein to a level approximately two-thirds of the depth of the chamber 35, and the same is maintained under agitation to insure uniform consistency by suitable agitating blades or paddles 37 carried on a rotatable shaft 38 extending laterally through the base D and rotatable in bearings 39. The shaft 38 at one end carries a worm gear 40 driven by a worm pinion 41 mounted on a drive shaft 42 rotatable in bearings 43 at one end of the base D and said shaft is operated by power delivered directly thereto from a motor 44. At the base of the chamber 35 within the base D is extended a suitable water jacket 35' in which is positioned a perforated steam and water receiving pipe supplied with either steam or water through the injection valve controlled supply pipes 46 and 46' employed for controlling the temperature of the water within the jacket which in turn regulates the temperature of the material or chocolate mass contained within the chamber 35, the excess steam and water raising upwardly around the outer walls of the chamber 35 and escaping or overflowing ducts 47 disposed vertically in portions of the front and rear walls of the reduced portions E of the section A Figure 4 of the drawings. From the ducts 47 extend suitable outlet pipes, not illustrated, for conveying the outflow water to any suitable place.

At the extreme lower end of the base D are provided suitable heating elements 48 preferably in the form of burners which are preferably independently controlled by valves 49 and said heating elements are adapted to maintain a temperature of the water in the jacket 35' immediately above the dividing wall 51 separating the chamber 50 from the water jacket 35' into which the pipes 45, 46 and 46' extend. To ascertain the temperature of the water within the water jacket 35', I provide a suitable thermometer 52, Figure 2 of the drawings. The upper wall forming the chamber H, Figures 3, 4 and 21 of the drawings, is of substantially pyramidical formation, and transversely across said upper wall extends a coating elevator belt 53, passing around rolls 54 at the upper and lower ends of the channels 36 and over suitable supporting rolls 55, at the peak of the upper wall of the chamber H, which rolls are supported on rotatable shaft 56, Figures 3, 4 and 21 of the drawings. The belt 53 in driven by and passes around a suitable operating wheel drum 57 carried by the shaft 38, the periphery of which extends in close proximity to the lower end 36 of the container 35. The operation of the belt 53 in the direction of the arrow Figure 4 will, as it passes through the mass of heated chocolate or shell forming material in the chamber 35 pick up and elevate the chocolate or shell forming material adhering thereto and carry the same to a point adjacent the peak of the upper wall of the member H where it is scraped therefrom by a suitable pivoted scraper 58 contacting with the outer surface of the belt 53, as in Figures 3 and 4 of the drawings. The material thus removed from the belt drops or flows by gravity over the lateral directing walls 59 and 59' of the wall of the member H and over the wall 59 passes downwardly toward the front and rear of the reduced portion E on the inclined walls 60 dropping downwardly from the terminal ends thereof through channels 60' into the ends of a suitable open top trough 61 extending transversely of the upper portion of the chamber 35 adjacent one side wall of the reduced portion E at its base and due to its flowing consistency, flows towards the center of the trough. The temperature of the material contained within the trough 61 may be readily ascertained by the thermometer 61' carried on the face of the apparatus, as in Figure 2 of the drawings.

From the trough 61, the material or chocolate forming the shell of the confection is fed into the molds as the same are moved into register therewith in the following manner:—

The trough 61, Figures 3 and 21 of the drawings, extends transversely of the side of the top wall 62 of the chamber 35 and which top wall is provided with a transverse row of perforations 63 one in line with each of the cups or molds 16, as the cups or molds are moved into register therewith.

To introduce into the respective molds, shell forming material in a plastic flowing condition and in a charge less than the capacity of the molds, and from which charge the shells are formed, I employ within the trough 61 a plunger 64 associated with each perforation 63, said plungers being mounted to reciprocate within suitable guide openings 65, and at their lower ends are engaged with the free end of a suitable operating frame 66 pivoted to a support 67, and the rear short end of the frame is adapted to contact with an actuating lug 68 rotatable in the direction of the arrow Figure 3 of the drawings, with a shaft 69. This shaft extends transversely within the chamber 35 and carries on its outer end a gear 70 with which intermeshes a shaft driving gear 71 loosely mounted on a countershaft 72, and carries on its end surface clutch dogs 73. The countershaft is rotatable within suitable bearings on the clutch frame 74, and has keyed to rotate therewith a dog clutch 75 which is movable longitudinally thereof into and out of engagement with the dog 73 of the gear 71, the clutch being operated by a suitable lever 76, which carries a notched plate 77 engageable by a retaining spring 78 which is adapted to hold the clutch members in driving engagement. The lower end of the shaft 72 carries a gear 79 intermeshing with the corresponding gear 80 on a rotatable shaft 81 mounted in bearings 82 exteriorly and transversely of the front of the chamber D, said shaft 81 being driven through a chain connection 83 from the shaft 38. The rotation of the shaft 69 in the direction of the arrow, Figure 3 of the drawings, by the above described mechanism reciprocates the plungers 64 within the perforations 63 removing and elevating a charge of material from the trough 61 and depositing said charge within one of the molds in register with each of the perforations 63, thus the initial charge for forming the coating or shell of the confection is supplied to the respective molds when the molds are positioned with their open ends downwardly disposed. This charge of the material less than the capacity of the respective molds being in a state of plasticity approaching a flowing condition, flows by gravity and capillary attraction downwardly over the mold surfaces, gradually cooling and forming within the mold a rough shell. During this operation, the conveyer is at a point of rest and immediately succeeding the operation the conveyer is operated by a step movement to advance the charged molds through the apparatus by the following mechanism:—A countershaft 84 is disposed upwardly at right angles from the shaft 81 and the same is rotatable in bearings 85, it having gear connection as at 86 at its lower end with the shaft 81. The shaft 84 carries a cam 87 surrounding which is a cam ring 88 laterally from which extend arms 89 and 90, the cam being adjustable longitudinally of its shaft 84 between collars 91, and is held to rotate with said shaft 84. The arm 90 carries a pin 92 receivable within a slot 93 of an oscillating lever 94 fulcrumed on its upper end to swing about a shaft 95, and said lever 94 carries a pivoted pawl 96 for engaging a ratchet 96' on the hub of a suitable gear 98 rotatable about the shaft 95. The gear 98 has driving connection at opposite points on its periphery with driving gear wheels 99 and 100 mounted on the end of the respective shafts 13 and 12. The oscillation of the lever 94 imparts intermittent rotary movement to the gear 98, which in turn transmits an intermittent rotary movement to the gears 99 and 100 driving the same in the direction of their respective arrows, Figure 2 of the drawings, which in turn impart rotary movement to the sprockets 10 and 11 in the direction of the arrows, Figure 3 of the drawings, moving the conveyer by a stepped motion in the direction of its arrows, Figure 3 of the drawings.

The charged molds moving with the lower flight of the conveyer in the direction of the arrow, Figure 3 of the drawings, from in register with the perforations 63 are brought into register with suitable perforations 101 on the upper surface of an air blast pipe 102 extended transversely in parallel relation adjacent to the trough 61. Air is supplied to the pipe 102 from any suitable source through a valve connection 103, and on discharging from the perforations 101 directly and upwardly into the charged molds completes the distribution of the chocolate or shell forming material charge within their respective molds uniformly over the inner surface of each mold, and discharges the surplus material, leaving a non-compressed shell having a smooth inner surface within each mold. The movement of the conveyer thence carries the molds with the thin evenly distributed chocolate coating or shell forming material therein from the pipe 102 over suitable scraper blades 104 which remove any excess material projecting beyond the edge of the respective molds, which drops by gravity into the chamber 35.

To insure uniformity in the thickness of the walls of the material thus deposited and formed in the respective molds, I prefer to compress the shell walls, and for accomplishing this I employ a suitable core for reception within each mold during a portion of its travel immediately after being supplied with the charge of coating material, and said cores are constructed and operate in the following manner:—

An endless conveyer 105 of any suitable material extends longitudinally of the shell chilling chamber 106, which is the lowermost chamber in wing C, and the same operates at its opposite ends around sprockets 107, one positioned adjacent the scraper 104 immediately below the edge of the cover 62 for the chamber 35, Figure 1 of the drawings, and the other in a plane slightly below said first mentioned sprocket at a point adjacent the sprocket 3, Figure 5 of the drawings. The major portion of the upper and lower flights of the conveyer 105 are disposed parallel with the lower flight 8 of the main conveyer, but that portion of the upper and lower flights adjacent the sprocket 107, Figure 5 of the drawings, is inclined for the hereinafter described purpose. The conveyer is provided with parallel spaced rows of outwardly extended retaining collars 108 arranged to correspond to the arrangement of rows of molds or cups on the main conveyer, and said shells are preferably threaded into the conveyer 105, as in Figures 7 and 13 of the drawings. The retaining shells are each provided with a shouldered opening 109 through which projects the multiple part outwardly tapered forming core members 110 substantially semi-circular in transverse cross section, and said core members are shouldered to be held within the shell 108 by the shoulders of the opening 109. The core members 110 are received at their base in an enlarged opening 111 in the shell 108, the open end of said opening through which the core members 110 are inserted into said shell 108 is closed by a disc 112 having an opening 113 centrally therethrough. The inner walled surface of the core forming members 110 are beveled preferably to correspond with the angle of the outer surface, but are disposed in parallel relation in a horizontal plane, thus permitting the movement of said core forming sections to and from each other, as in Figures 7 and 13 of the drawings.

The core forming members 110 at their respective bases 114 are provided on their inner surfaces with suitable lugs 115 with which are adapted to co-act the under surface of a disc 116 carried by a core operating plunger 117, the stem of which passes through the opening 113 in the plate 112. The end of the plunger 117 co-acting with the members 110 at a point above the disc 116 is tapered or wedge shaped as at 118 to cooperate with the inner tapered walls of members 110 to normally support the same when the plunger is in operative position, as in Figure 7 of the drawings. A spring 119 coiled about the stem of the plunger 117 normally forces the same into what may be termed operative position, and on the withdrawing of the plunger from operative position, as hereinafter described, the under side of the disc 116 contacting with the upper surfaces of the lugs 115 causes an inward movement of the core forming members toward each other as in Figure 13, reducing the circumferential area of said core at a time when the core is to be withdrawn from the mold. To assist in the collapsing of the core members 110, I provide suitable coiled springs 120 in recesses in the shell 108 and to press against the core forming members at a point slightly above the lugs 115.

The conveyer 105 carrying the forming cores is not provided with an independent source of power for operating the same, but it will be observed that by disposing the upper flight of the conveyer 105 immediately below the lower flight 8 of the main conveyer with one of the supporting and drive rollers 105' driven by the sprocket 3, and, in timed relation with said main conveyer with the core forming members disposed outwardly, that said respective rows of core forming members are automatically received in the corresponding rows of molds when the main conveyer is operated in the direction of the arrow, Figure 5 of the drawings, and thus after the shell has been blown in the respective molds the same is further molded by the action of the cores. On the traveling of the core members to a point adjacent the downward inclination of the belt 105, the respective stems 117 pass through suitable slots 121 in a core release plate 122 extending transversely of the apparatus supporting frame and the plate toward its discharge end is downwardly inclined, as at 123, to lie parallel with the inclined portion of the conveyer 105, thus it will be apparent that the heads 124 on the respective stems 117 which lie beneath the plate 122 and project on each side of the respective slots 121, will, as they contact with the under surface of the plate cause a collapsing of the core members 110, this operation being particularly illustrated in Figures 5, 6, 7 and 13 of the drawings. During this collapsing of the core members 110, it will be observed that the cores are gradually removed from their associated mold prior to the respective rows of molds passing around the sprocket wheel 3, Figure 5 of the drawings. As the molds pass around the sprocket wheel 3 it will be observed that they are turned with the open ends disposed upwardly throughout the entire travel of the upper flight of the conveyer.

As the successive rows of molds or cups 16 are turned with their open ends disposed upwardly, said rows are moved by the step motion of the conveyer to a point immediately below a suitable reservoir 122 for containing fondant or filler to be supplied to the upturned shells within the respective molds and forming the filler for the confection. The reservoir 122 is divided vertically into a plurality of open topped chambers or compartments 123 each adapted for containing a quantity of suitable filler material such as cream or the like, and if desirable the fondant or filler material in all of the chambers may be the same or it may be different as to color, flavor, construction or the like. It will be observed that the material in each of the chambers will supply the shells of their corresponding line of molds of the rows of molds with a similar filler until the supply within the chamber is exhausted or renewed. Owing to the consistency and heavy body of the filling material within the chambers or compartments, it is desirable to provide means for removing from the respective compartments a predetermined charge of material and to inject this charge of material into the open ends of the confection forming shells, and to accomplish this purpose I prefer to use the following mechanism:—

The elongated lower end of the reservoir 22 disposed transversely in close proximity to, and above the upper conveyer flight 7 and is provided with a plurality of apertures 124, one associated with the base of each compartment 123, and one in line with each line of molds of the respective rows of molds carried by the endless conveyer. Beneath said openings 124 is provided a suitable valve mechanism consisting of a valve body 125 formed in its upper surface with material inlet openings 126. one cooperating with each aperture 124, and which openings each connect with an independent cylinder 127 all of which open at one side of the valve body 125, Figure 19 of the drawings. From each cylinder 27 extends a downwardly disposed material discharge opening 128 disposed in alignment with the apertures 124 of the respective chambers 123, as in Figure 18 of the drawings. Suitable sliding valve plates 129 and 130 are positioned within the valve body 125 intersecting the openings 126 and 128, each of said plates being provided with a port 131 for registering with their respective passages 126 and 128, as in Figure 18 of the drawings.

Mounted in each of the cylinders 127 is a piston 132, each carrying a stem 133, and each stem is in turn pivotally connected to the end of a supporting lever 134 mounted on an adjustable fulcrum 135, the inner end of which is adapted for receiving within one of a plurality of threaded openings 136 disposed vertically in a supporting plate on one face of the reservoir 122. The upper end of each lever 134 pivotally connects with a cam surface 138 on a rotatable shaft 139, mounted in bearings 140 at opposite ends of the reservoir 122, and extending transversely of one face thereof. The rotation of the shaft 139 in the direction of the arrow Figure 19 of the drawings, operates said levers 134 on their fulcrum 135 reciprocating the respective pistons within their associated cylinders. The longitudinal adjustment of the fulcrum member 135 on the lever 134 controls or varies the stroke or movement of the lever 134 which regulates the movement of the piston 132 controlling the charge or volume of material delivered thereby into the respective shells. It will be apparent that by providing an independent adjustment of the fulcrums 135, the volume of the material controlled by each piston may be independently varied. To rotate the shaft 139 in the direction of the arrow, Figure 19 of the drawings, I connect said shaft through gear connection 141, Figure 1 of the drawings with the shaft 142, which is driven through a bevel gear 143 from a short shaft 144, it in turn being driven by the shaft 81, as in Figure 2 of the drawings. In order to provide a communication between the respective chambers 123 and their associated cylinders during the outward movement of the pistons within the respective cylinders, and to cut off the discharge communication from the cylinders at this time, I provide a means for operating the slide valves to alternately position their respective ports in register with the passages which they control, and which means consists of arms 145, the ends of which are pivotally connected through slotted guides 146 with the ends of the respective slide valves 129 and 130. The arm member 145 is fulcrumed to oscillate in a bearing 146', and carries on one end the laterally extending arm 147 which is forked at its end as at 148. Between the forks on the end of the arm 147 extends one end of a lever 149 adapted to swing midway of its length on an adjustable fulcrum 150, the upper or free end of said arm being disposed between suitably spaced discs 151 mounted on the shaft 139, said discs carrying on their inner adjacent faces at diametrically opposed points about the shaft 139, cam surfaces 152, which, on the operation of the shaft 139, swing the lever 146 on its fulcrum 150. The valve operating mechanism is so arranged as to provide a communication between the cylinders and the interior of the respective chambers 123, during the outward movement of the pistons, and when the discharge communication from the respective cylinders is closed, and to close said communication between the chambers and the cylinders during such time as the discharge communication is open and the pistons are moving inwardly in their respective chambers. Thus the material is drawn from the respective chambers into the cylinders, and is afterwards forcibly expelled therefrom into the molds insuring uniform predetermined discharges of filling material to be supplied to each of the formed shells within the molds as the same are moved into register with the openings 128.

After each of the shells of any given row of molds are supplied with filling material from the reservoir 122, movement of the conveyer supporting the molds carries the same longitudinally through the chilling chamber 152' into and through the upper chilling chamber 153 of the wing C. thus chilling the confection and the filler contained therein.

Figure 2:
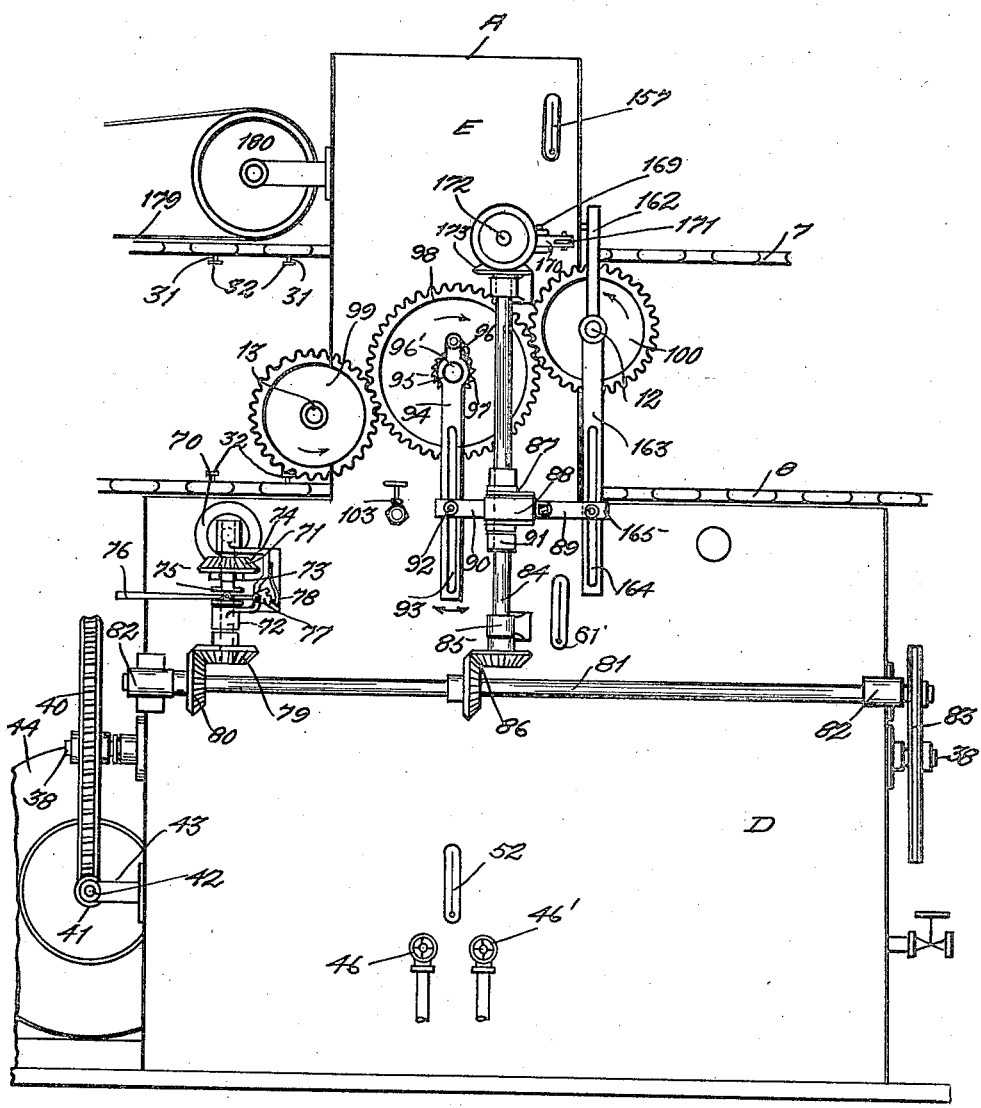
Figure 2 is a view in front elevation of the upper portion of the coating containing chamber, illustrating the various drive mechanisms carried thereby.

It will be observed that the filled confections are up to this point not supplied with a coating for closing the open end of the mold which completes the outer shell, and in the present embodiment of the invention forms the bottom of the confection, but as the molds are successively moved with the upper flight of the conveyer toward the reduced portion E of the central section A of the apparatus, the same are supplied with a closure coating of the same material which forms the shell, this mechanism being particularly illustrated in Figures 2 and 3.

Immediately prior to receiving this shell closure coating material, the exposed peripheral edges of the shell opening are passed immediately beneath a suitable heating element $152^3$, which is disposed transversely above the upper conveyer flight 7 between the inner end of the chamber 153 and the reduced end E of the main portion A of the apparatus, said heating element preferably being in the form of a suitable coil supplied with electricity through the leads 152⁴, and the action of this heat on the edges of the chilled shells within the molds melts the same sufficiently to permit the closure filling, hereinafter supplied, to readily adhere thereto and form a part thereof when the same becomes cooled as hereinafter described.

The shell forming material removed from the belt or elevator 53 by the scraper 58, and dropping on the directing wall 59′ passes therefrom into a sump 154 within the upper end of the centrally reduced portion E of the main portion A of the apparatus, and on said sump being filled to its capacity the material flows therefrom over the end walls 155, Figure 3, returning to the container 35 by gravity through the return channels 156, Figure 3 of the drawings. The temperature of the material within the sump 154 may be readily ascertained by a thermometer 157 communicating with the interior of the sump, and carried on the face of the apparatus, as in Figure 2 of the drawings. Like the fondant reservoir 122, the sump 154 is closed at its lower end by a valve body 158 extending transversely over the upper conveyer flight 7, and the same is provided with a plurality of vertical channels 159 extending therethrough, one in alignment with each mold of the respective rows of molds, and through said channels is supplied from the sump 154 a quantity of coating material in a plastic state, and of an amount sufficient, when filled confections are being molded, to provide a closure for the open end of the filled shell within the respective molds. The feeding of the shell closure forming material is controlled preferably in the following manner:—The body 158 is provided with a plurality of cylinders 160, one communicating with each channel 159 intermediate of its ends, and in each of said cylinders is mounted to reciprocate a piston 161, the stems thereof being connected to an operating frame 162 pivotally supported on its ends on the shaft 12, and one end thereof forming the upper extension of a swinging lever 163 slotted at its lower end as at 164, and within which slot extends an operating pin 165, on the outer end of the arm 89. While the valve gear of the closure supplying material sump is of a construction different from that associated with the fondant container 122, it will be understood that the fondant container and its valve gear may be used in place of the sump 154 with but little alteration to the apparatus. The adjustment of the pin 165 of arm 89 longitudinally of its slot 164 will vary the stroke of the pistons within their cylinders to vary the amount of material supplied to the cups for closing the same. This adjustment also enables the fondant or filler to be eliminated and the molds to be entirely filled with and closed by the same material that forms the shell. It will be apparent that on the reciprocation of the arm 89 by the rotation of the shaft 84 oscillating movement is imparted through the lever 163 to the frame 162, reciprocating the pistons 161 in their respective cylinders. Suitably operated slide valves 166 and 167 are positioned to control the opposite ends of the channels 159, the port in the valves being arranged in such a manner that on the reciprocation of the valves, opposite ends of the channels 159 will be alternately opened and closed, the inlet ends being opened on the outward movement of the pistons, at which time the discharge ends are closed, and the discharge ends being opened on the inward movement of the pistons, at which time the inlet ends are closed. The plate valves 166 and 167 are disposed with their ports in staggered relation longitudinally of the respective valves, the ports assuming a normal position relative to each other as is illustrated between the valves 129 and 130 in Figures 18 and 19 of the drawings, but unlike the valves of the fondant container, valves 166 and 167 are operated simultaneously in the same direction, they being pivotally connected at their respective outer ends as at 169 with a lever 170 which is pivotally mounted at one end as at 171 to the outer surface of the reduced portion E of the central section A of the main portion of the apparatus. The mechanism for operating the lever 170 is similar to that illustrated in Figures 18 and 19 for operating the lever 146 and consists of a rotary stub shaft 172 disposed at right angles to the shaft 84, and having gear connections through the bevel gears 173 with the shaft 84. The stub shaft carries a pair of spaced cam discs 174 and 175 disposed one on each side of the free end of the lever 170 and carrying on adjacent faces lever operating cams 176, the discs being capable of independent adjustment about the stub shaft 172. While the charge of closing material discharged into each mold from the sump 154 is of a sufficient quantity, when what is termed "filled goods" is being manufactured, to close the open end of the filled shell, it will be apparent that the forming of the shell and filling of the same with fondant from the reservoir 122 may be eliminated, and the adjustment of the arm 89 in the slot 164 may be varied from that illustrated in Figure 2, enabling a charge to be fed to each mold of a sufficient quantity to entirely fill the same, and form then what is termed "solid goods". By this present arrangement also, it will be apparent that where chocolate shells, or shell forming material are preferred in the molds, the same may be readily filled and closed with the same material of which the shells are formed.

After the closure has been provided for the shell, as above described, or a piece of solid goods has been formed in the molds, the travel of the upper flight of the conveyer 7 by its motion conveys the closed and filled or formed confection through the reduced portion E of the central section A of the apparatus with the closed end of the shell, or the bottom of the formed confection, upwardly disposed, and conveys the same into and through the upper confection chilling chamber 177 in the wing B of the apparatus, Figure 1 of the drawings, and into and through the chilling chamber 177' also in wing B of the apparatus. The passage of the confection through these chambers chills the closure forming material so that the same will solidify, and the formed confections are now ready to be discharged from the molds and removed from the apparatus, and to accomplish this purpose I prefer to employ the following mechanism:—An endless distributing belt 178 on to which the finished confections are discharged from the molds in a hereinafter described manner, extends longitudinally of the wing B of the apparatus with its lower flight 179 disposed immediately above and in parallel relation with the portion of the upper flight 7 of the main conveyer within the wing B and passes around the sprockets 2 in close proximity therewith, and as in Figures 8 of the drawings. The portion of the belt at the inner end of the wing B passes around a roller 180 and at the far end of the wing B operates over suitable idler and supporting rollers 181. A portion of said endless conveyer 178 extends downwardly at an incline, as in Figure 1, and around a stationary support 182 which lies adjacent to one end of a distributing table hereinafter described. The outer surface of the conveyer 178 carries a plurality of overlapping sheets of material 183 preferably of oiled material, such as paper, which are secured in any suitable manner to the belt at their forward ends, as in Figure 8 of the drawings, and these sheets are adapted, as they successively pass around the roller 180 to contact with the closed end of the respective confections as carried by their associated molds, and the sheets are forced into contact with the closed end of the confections by suitable pressure roller 184 disposed transversely above the lower flight 179 of said distributing conveyer. It will be apparent that by providing the conveyer 178 with its lower horizontal flight disposed as at 179, Figure 1 of the drawings, the open ends of the molds containing the finished confections are provided with a closure which moves with the upper flight 7 of the main conveyer, and at such time and in a manner hereinafter described, as the molds pass around the sprocket 2, the molds will be turned with their open ends downwardly which permits of the confections adhering to the sheets 183 to discharge therefrom and be supported on said sheets 183.

As molds with the confections contained therein approach the sprocket 2, the mold actuating bars 27 contact at their ends with the mold release bar 185 disposed longitudinally of one side of the upper flight 7 of the main conveyer causing an inward movement of the members 27, which, through their associated parts actuate the mold sections 17 and 18 to cause a separation thereof, permitting the release of the confection from the walls of their respective molds, and said mold sections are held separated until the same pass around the sprocket 2 and return on the lower flight 8 of the main conveyer. To further insure the release of the formed confection from within the molds, heads 32 of the stems 31 are moved through slots 186 in suitable downwardly inclined plates 187 disposed between the upper and lower flights 7 and 8 of the main conveyer, and which plates are arranged in parallel spaced relation transversely of the conveyer, thus the plates 29 are removed from their associated ends of their respective molds a number of times, and after each time of being removed are permitted by the action of the springs 34 to strike against the end walls of the molds with which they normally contact. The operation of the plates 29 as described, and the separation of the mold sections 17 and 18, insures the release of the molded confection from within their respective molds, and as the respective rows of molds pass around the sprocket 2, the formed confections therein adhering to the sheets 183 are now deposited on to the sheets 183 which have moved therewith through frictional contact.

From the sheets 183, the molded confections are deposited on to a suitable assorting and packing table preferably constructed in the following manner, reference being had to Figures 1, 22, 23, 24 and 25 of the drawings. The assorting packing table consists of a suitable horizontal frame 188 open at one end and adjacent the member 182, and which open end is parallel with and in close proximity to the member 182 in the drawings. At opposite ends of its open portion, the frame 182 is provided with belt supporting rollers 189 and 189' over which operate the endless distributing belt 190 of a length and width corresponding with the opening in the frame 188, as in the drawings. The belt 190 is driven in the direction of the arrow, Figure 123 by a shaft 191, which has driving connection 192 with a gear on the end of the roller 189, and said shaft 191 being in turn driven through a geared connection by a shaft 193, which in turn has geared connection with the shaft 81, Figure 1 of the drawings.

Extending transversely of the frame 188 adjacent the roller 189' and disposed slightly above the belt 190, is a curved guide supporting frame 194 consisting of a supporting section 195 and a directing plate supporting section 196 in rear thereof. Disposed transversely above the roller 189' is a member 197 having a plurality of apertures 198 in the upper face thereof. On the portion 195 of the frame 194 are mounted through pivotal connections 199 the inner ends of guide boards 200 radiating from the frame 188, and said boards between provide distributing runways 201 each communicating at its discharge end with a packing table or section 202 arranged throughout the surface of the frame 188, as in Figure 23 of the drawings. When it is desired to distribute the finished confections from any given line of molds of the respective rows of molds to a particular operator or packer, I prefer to employ suitable guide plates 203 associated at one end with each of the apertures 198, and at their opposite ends provided with upstanding hooks 202' extending on the guide 196 and with their ends disposed in line with the pivotal connection 199 of the respective guide boards 200. Thus, by reference to Figure 22, it will be observed that by providing a plate 203 between which the confections of the respective lines of molds of the rows are received, said confections may be each distributed to an operator or packer or if desirable any number of the plates 203 may be eliminated, or they may be adjusted relative to the apertures 198 to direct the confections from two or more lines of molds to any given packer.

In Figure 22, pivotal adjustment of the boards 200 is indicated in dotted lines, and where it is desired to pack the confections in bulk, and without being wrapped, the same pass through suitable discharge openings 204 in the table 188, beneath which openings are preferably positioned pails, boxes or like containing vessels.

Figure 24:
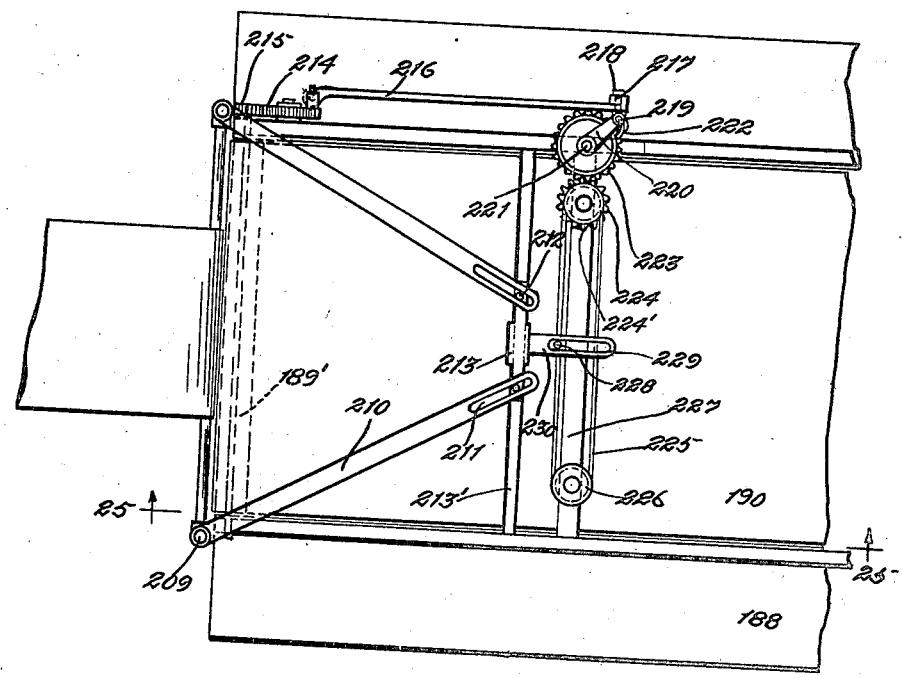
Figure 24 is a view in bottom elevation of the means for moving the delivery chute illustrated in Figure 23.
Figure 25:
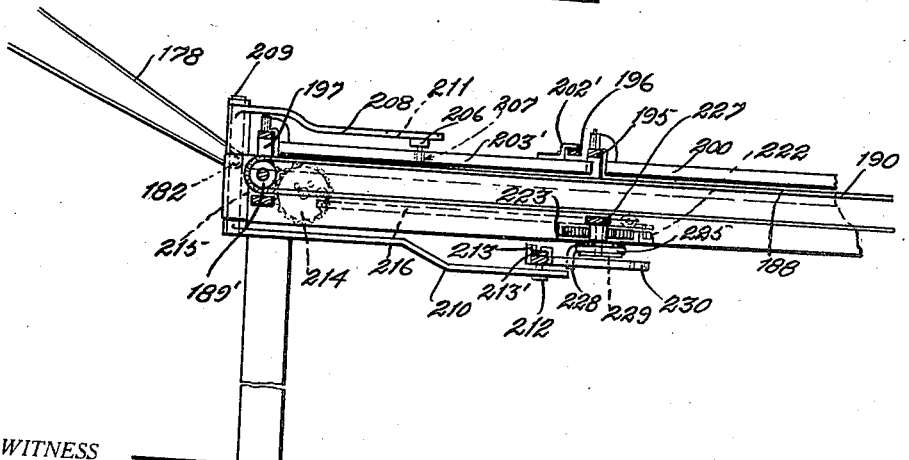
Figure 25 is a sectional view of the mechanism illustrated in Figure 24 taken on line 25—25 of Figure 24.

When it is desired to distribute the confections from all the lines of the respective rows of molds successively to the different packing tables 202, the intermediate plates 203 of the series illustrated in Figure 22 are eliminated, and the extreme side plates are disposed with their free ends converging forming a discharge chute of a width equal to the distance between the pivotal supports 199 of the boards 200, Figure 23 of the drawings, and said chute swings in an intermittent movement transversely over the belt 190 by the following mechanism:—Overhanging the converging plates 203', Figure 23 of the drawings, and disposed transversely thereof is the plate operating bar 205 carrying spaced pins 206 which are received in openings 207 in the upper edge of the plates 203', Figure 24 of the drawings.

Figures 15, 16:
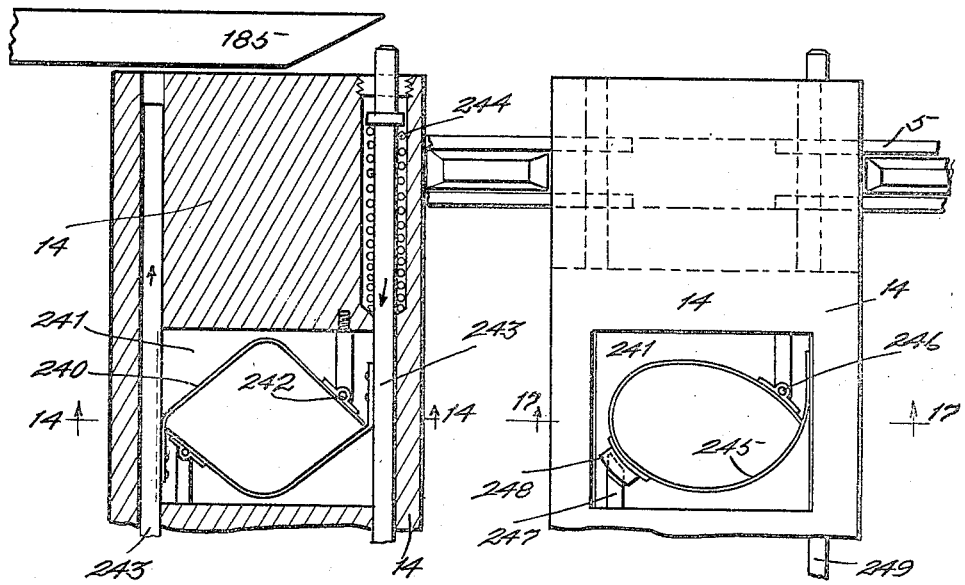
Figure 15 is a horizontal sectional view taken on line 15—15 of Figure 14.
Figure 16 is a view in bottom plan of another modified form of mold construction, wherein the mold forming member is in a single piece, taken on line 16—16 of Figure 17.

Pivotally connected with the opposite ends of the bar 205 through a sliding connection 207 are the converging arms 208 mounted to swing transversely over the belt 190 on the vertical fulcrums 209 adjacent the roller 189'. From the lower ends of the vertical fulcrums 209, Figure 24 of the drawings, extend to a point beneath the frame 188, the converging arms 210 slotted at their outer ends as at 211, and into which slots project pins 212 carried by a transverse guide sleeve 213 slidable transversely across the under surface of the frame 188 on a guide rod 213'. To impart an intermittent movement to the member 213 to cause an intermittent swinging of the plates 203' over the belt 190', I provide a gear 214, which intermeshes with a gear 215 on one end of the roller 189' and from said gear 214 extends an eccentrically mounted link connection 216, which at its outer end has pivotal connection on a horizontal axis, as at 217, with a member 218 pivotally supported as at 219 to swing on a vertical axis relative to a bracket 220 swinging on a vertical shaft 221 beneath the frame 188. The member 220 carries a spring pressed pawl 222 for engaging a ratchet wheel 223 rotatably about the shaft 221. The ratchet wheel 223 engages a gear wheel 224 carrying a sprocket 224' around which passes one end of a chain 225 disposed transversely beneath the belt 190, said chain 225 at its opposite end passing around an idler sprocket 226, the sprocket 224' and idler sprocket 226 being mounted on a support 227 connected at its opposite ends with the under side of the frame 188. The endless chain 225 carries a downwardly extending pin 228 which projects into an elongated slot 229 formed in an arm 230 extending outwardly from the sleeve 213. It will be apparent that the intermittent motion of the chain 225 will transmit intermittent movement through members 210 to the arms 208, which will in turn intermittently and simultaneously operate the plates 203' to position the discharge end of the chute formed thereby into register with successive guide channels 201 formed by the members 200. This intermittent motion permits the entire discharge of the confections of any given row or rows of molds from the end of the chute formed by the members 203' prior to the confections of a succeeding row or rows of molds being conveyed to a point to discharge from the end of the chute formed by the members 203'. In Figures 14 to 17 inclusive, I have illustrated two modified forms of mold construction, that illustrated in Figures 14 and 15 consisting of a mold substantially square in plan and composed of the angle plates 240 mounted within a mold receiving opening 241 formed in the mold bar 14. The opposite ends of the plates 240 are anchored through a pivotal connection 242 at opposite sides of the opening 241, and the free ends of the plates 240 are disposed relatively to the anchored end of the opposing plate and are secured to suitable rods 243 disposed longitudinally within the bar 14. In this construction the rods 243 are adapted for longitudinal movement in opposite directions relatively to each other to open or separate the free ends of the plates 240 from the anchored ends of their associated plates in opening the molds, the respective bars being normally held in closed position by the coiled springs 244 which cooperate with the outer ends thereof, one of which is illustrated in Figure 15 of the drawings.

Figures 14, 17:
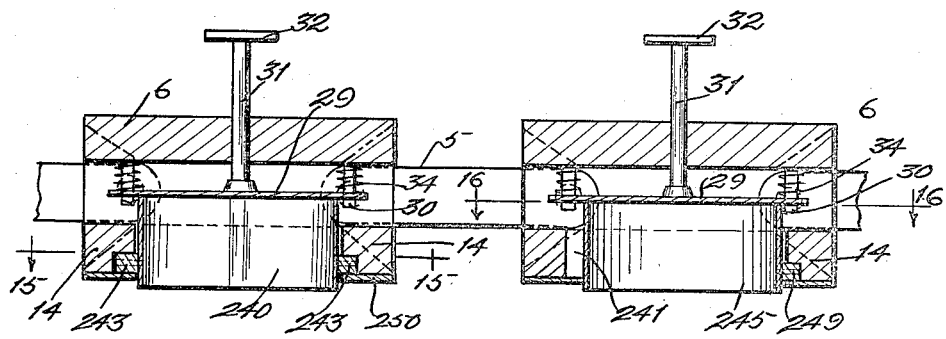
Figure 14 is a transverse sectional view taken on line 14—14 of Figure 15.
Figure 17 is a vertical sectional view taken on line 17—17 of Figure 16.
Figure 28:
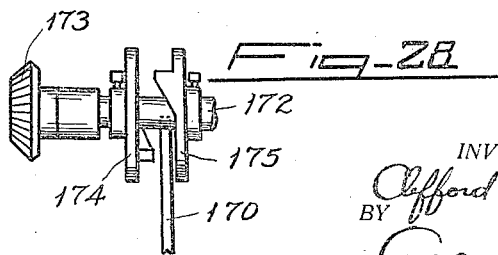
Figure 28 is a view in detail of the drive mechanism for feeding the shell closing material to the shells.

In Figures 16 and 17, the construction is somewhat similar to the modified form illustrated in Figures 14 and 15 with the exception that a single piece of flexible strip material 245, preferably of metal, forms the mold, and in making such construction I prefer to anchor the end 246 of the strip 245 to one wall of the opening 241, through a pivotal connection. The strip 245 intermediate of its length, and on the outer surface of its coil is supported by a finger 247 which engages a lug 248 on the surface of the strip. The free end of the strip is secured to an operating rod 249 longitudinally movable within the member 14 and the longitudinal movement of said rod 249 is adapted to open and close the mold as will be readily apparent.

In both of these constructions, the usual closure plate 29, and its associated elements, is provided for closing the inner end of the mold, and a face plate is provided for each bar 14.

The chilling chambers within the wings B and C are preferably maintained at a temperature of between the 30 and 60 degrees Fahrenheit to insure the best results in the making of the confection, and such temperature is maintained preferably through a series of pipes 251 communicating with the respective chambers and connected through a controlling valve 252 with a supply pipe 253 extending from a suitable refrigerating chamber 254.

By my present invention it will be readily apparent that the confections of any design, ornamentation, shape, size and flavor are formed or molded in permanent molds, thus dispensing with the present form of starch molds.

It will be further apparent that a number of different flavored confections may be simultaneously molded, and each different flavor may be distributed to an independent packer; also that confections may be formed wherein the filler is of the same material as the shell or coating.

I claim:—

1. A confection making apparatus including a movable mold, means for supplying the same with a charge of flowing shell forming material less than the capacity of the mold upwardly through the opening in the base thereof, means receivable in and movable with the mold for a portion of its travel for forcibly distributing the supplied charge over the inner wall of the mold to form a hollow shell thereof within the mold, means for filling the shell, means for closing the opening therein, and means for receiving the confection as discharged from the mold.

2. A confection making apparatus including a movable mold, means for supplying the same with a charge of material less than the capacity of the mold through an opening therein, means for distributing and compressing the supplied charge over the inner wall of the mold to form a shell therein having an open bottom, means for filling the shell, means for supplying a bottom closure of shell forming material to the shell, and means movable with the mold for receiving the confection as discharged from the mold.

3. A confection making apparatus including a chamber for containing a body of confection forming material in plastic condition, an expansible mold formed of separable sections permanently united together and movable as a unit relative thereto, means for supplying the mold when contacted with a charge of material from said chamber to form a confection therein, means for chilling the mold after being so supplied, means for expanding the mold to discharge the confection therefrom, and means movable with the mold for receiving the confection as discharged from the mold.

4. A confection making apparatus including a chamber for containing a body of confection forming material in a heated plastic condition, a mold movable relatively thereto for cooperating therewith, means for supplying a charge of material less than the capacity of the mold from said chamber to said mold at one point in its movement and when said mold is in an inverted position, means movable with the mold for distributing and compressing the supplied charge over the inner surface of the mold, and means at another point in the travel of the mold for filling said shell with material from said chamber.

5. A confection making apparatus consisting of a cupped expansible mold consisting of a plurality of independent sections, an endless conveyer mounting the same for moving the same into a plurality of positions, means for forming a confection shell within the mold and from a quantity of material less than the capacity of the mold when in a contracted position and its open end is disposed in one direction, means for supplying a filler to the formed shell when the open end of the mold is disposed in another direction, means within the path of travel of the mold for expanding the mold for releasing the shell from the mold, means movable with the mold for receiving the confection as discharged from the mold when the same is again moved into its first position, and means for contracting the mold on the discharge of the confection therefrom.

6. A confection making apparatus consisting of a cupped expansible mold, a horizontally disposed endless conveyer for mounting said mold with its open end outwardly disposed, said conveyer being divided into upper and lower flights, means for supplying a charge of shell forming material to the mold through its open end when the same is contracted and is downwardly disposed and is associated with one flight, means for filling the shell, means for closing the shell when the open end of the mold is upwardly disposed and is associated with the other flight, means for expanding the mold for receiving the formed confection from the mold when the same is again disposed with its open end downwardly.

7. A confection making apparatus consisting of a conveyer, a mold carried thereby and open at its discharge end, a closure plate movable to and from one end of said mold for closing the same, said mold consisting of a plurality of wall sections adapted to cooperate with their meeting edges in contact, a flange extending from the outer face of each section and provided with a slot, a section operating ring associated with the conveyer and surrounding said sections, a pin carried by said ring for cooperation with each slot, means for cooperating with the ring for moving the same axially of the mold for moving the sections to open and close the mold, means for supplying the interior of the mold with confection forming material, and means for expanding the mold sections for releasing the confection therefrom.

8. A confection making apparatus consisting of a container for containing a quantity of confection shell forming material, means for maintaining the shell forming material within said container in heated plastic condition, an endless conveyer of upper and lower flights operating transversely of said container, a mold carried by said conveyer, said mold being open at one end and arranged with its open end disposed toward the outer face of said conveyer, means for inserting and depositing a charge of shell forming material less than the capacity of the mold into the mold through its open end and when the mold is carried on the lower flight of said conveyer with its open end downwardly disposed, means receivable within and movable with the mold for a portion of its travel, for distributing and compressing the charge of material over the interior walled surface of the mold, a cooling chamber through which the mold with its contained shell is conveyed, means for filling the shell when carried on the upper flight of the conveyer and with its open end upwardly disposed, and means for discharging the filled confection from the mold on the returning of the same to the lower flight.

9. A confection making apparatus consisting of a conveyer, an expansible mold carried thereby and open at one end, means for supplying the mold through its open end and when contracted with confection forming material in a plastic condition, means for cooling the mold with the material therein to cause the material to set, means for expanding the mold to permit the discharge of the molded confection therefrom, means movable with the mold for receiving the discharged confection from the expanded mold, means for conveying the same therefrom, and means for restoring the mold to its normal contracted position on the discharging of the confection therefrom.

10. A confection making apparatus consisting of a conveyer, an expansible mold carried thereby and open at one end, means for supplying the mold with confection forming material in a plastic condition, means for cooling the mold with the material therein to cause the material to set, an endless confection distributing conveyer movable with the mold with its surface in contact with the confection at the open end of the mold, means for expanding the mold to release the confection therefrom, said mold adapted on being inverted by the movement of its supporting conveyer, and with its open end downwardly disposed to deposit said released confection on to the confection distributing conveyer for conveying from said mold.

11. A confection making apparatus consisting of a main portion including a material containing chamber and a plurality of tubular wing portions extended horizontally from opposite sides thereof and divided transversely into upper and lower chambers, means for cooling said chambers, means for maintaining the material within the containing chamber in a heated plastic condition, an endless conveyer operating at opposite ends around supporting rollers dividing the same into upper and lower flights arranged to move longitudinally through the respective upper and lower chambers of said wings, an expansible mold carried by the conveyer and open at one end, said mold being arranged with its open end disposed toward the outer surface of said supporting conveyer, means for inserting and depositing a charge of material from said container into the mold to provide a lining therefor, means for operating the conveyer to move said lined mold through one of said cooling chambers, means for supplying a filler to said lined mold, and means for expanding the mold to discharge the formed confection therefrom.

12. A confection making apparatus including a movable mold, means for supplying the same with a charge of material through an opening therein, means for injecting an air blast into the mold to distribute the supplied charge over the inner walled surface of the mold to form a shell therein, means for filling the shell, means for closing the same, and means for receiving the confection as discharged from the mold.

13. A confection making apparatus including a movable mold open at one end, means for supplying the same with a charge of plastic material of a quantity less than the capacity of the mold through the opening therein, a collapsible core insertable within and movable with the mold for distributing and compressing the supplied charge over the inner surface of the mold to form a relatively thin walled shell therein and for withdrawal therefrom on the formation of the shell, means for filling the shell, means for supplying additional shell forming material to the mold for closing the opening in the shell, and means movable with the mold for receiving the formed confection as discharged from the mold.

14. A confection making apparatus including a movable mold open at one end, means for supplying the same with a charge of plastic material through an opening therein, a collapsible core for cooperating with the interior of the mold through the opening therein for forcing the charge of material into contact with the inner side walls of the mold to form a shell thereof within the mold, means for filling the shell, and means for supplying additional material to the mold to close the open end of the shell.

15. A confection making apparatus comprising a conveyer, a mold carried thereby and open at one end means within the path of travel of the mold for supplying the same with a charge of plastic confection shell forming material less than the capacity of the mold, a collapsible core for distributing and compressing the shell forming material over the inner walled surface of the mold to form a relatively thin walled shell therein, open at one end, and means for chilling the mold with its contained shell.

16. A confection making apparatus consisting of a chamber for containing confection shell forming material in a plastic condition, an endless conveyer movable relative thereto and in cooperative relation therewith, a plurality of parallel spaced rows of molds disposed transversely of the conveyer and for movement successively into cooperative relation with said chamber, said molds being open at one end toward one face of the conveyer, means for simultaneously supplying the molds of the respective rows with a charge less than the capacity of the respective molds of plastic shell forming material from said chamber, means for injecting an air blast into said molds for distributing the respective charges over the inner walled surface of the respective molds to form a shell therein, means for simultaneously filling the formed shells of successive rows of molds, means for closing the respective shells, with a charge of shell forming material from said chamber, and means for discharging the formed confections from the successive rows of molds.

17. A confection making apparatus comprising a vessel for containing confection forming material in plastic condition, a mold, a conveyer for mounting and moving the mold, means for removing confection forming material from the vessel and for delivering the same to a plurality of discharge points within the path of movement of the mold, and means at each of said discharge points for delivering a quantity of said confection forming material therefrom to said mold, one of said means delivering a measured quantity of material.

18. A confection making apparatus including a mold, means for depositing a charge of plastic confection forming material on the surface thereof, means for directing an air blast onto the deposited charge to distribute the same over the surface of the mold to form a shell thereof, and means for discharging the shell from the mold.

19. A confection making apparatus comprising a vessel for containing confection forming material in a plastic condition, a mold, a conveyer for mounting and moving the mold, means for continuously removing confection forming material from the vessel, a plurality of receptacles into which said material is delivered, and within the path of movement of the mold, means for conducting the overflow material from said receptacles back to said vessel, and means associated with each of said receptacles for discharging a quantity of confection forming material into said mold.

20. A confection making apparatus comprising a mold, a conveyer therefor, means for supplying confection forming material to the mold for forming a confection therein, means for discharging the formed confection from the mold, a packing table including a plurality of discharge runways leading to different points thereon, and means for receiving the formed confection and for discharging the same on to a predetermined runway on said packing table.

21. A confection making apparatus comprising a movable mold, a vessel for containing confection forming material in plastic condition and provided with a plurality of discharge stations for supplying confection forming material to said mold at different points in its travel, means on each of said stations for delivering a predetermined quantity of confection forming material to said mold as the same cooperates therewith, and means for interrupting the feeding of material to the mold from one of said stations.

22. A confection making apparatus consisting of an endless conveyer, a mold open at one end and carried thereby and adapted on the movement of the conveyer to be positioned with its open end successively downwardly and upwardly disposed, a vessel for containing confection forming material in a plastic condition, means for supplying a charge of confection forming material upwardly into the mold through the opening therein when the same is downwardly disposed, an air blast discharging upwardly into the mold for distributing under pressure a charge of confection forming material over the inner surface of the mold to form a shell therein, and means for forcing into said shell a predetermined measured quantity of filler or fondant material when the open end therof is upwardly disposed.

23. A confection making apparatus including a conveyer, an expansible mold carried thereby open at one end and disposed with its open end adjacent the outer side of said conveyer, means for supplying said mold with confection forming material to form a confection therein, and means for receiving the formed confection from within the mold, the same consisting of an endless conveyer adapted to adhere to the formed confection through the open end of the mold, means for expanding the mold, and means for positioning the expanded mold to deposit the confection adhering to the conveyer thereon.

24. A confection making apparatus consisting of an endless conveyer, a mold bar carried thereby and provided with an opening therethrough, a mold positioned in said opening and open at its opposite ends and consisting of a plurality of separable sections adapted to contact at adjacent edges, a closure plate movable to and from one end of said mold for normally closing the same, a member associated with said mold sections for operating the same to open and close the mold, means for filling the mold with plastic confection forming material, and means in the path of movement of the conveyer for engaging said mold operating member to actuate the same to separate the mold sections to permit the discharge of the molded confection therefrom.

25. A confection making apparatus including a mold, a conveyer for mounting the mold, a vessel for containing confection forming material, means for supplying a charge of confection forming material to the mold, means for distributing the supplied charge of material over the inner wall surface of the mold to form a shell therein, a second endless conveyer movable with the first conveyer, a core carried thereby and adapted for projecting into the shell within the mold to further form and compress the same, said core consisting of a pair of collapsible sections, means disposed between the same for normally expanding the same, and means within the path of travel of the mold for withdrawing said expanding means to permit the collapsing of the core sections to enable the core to be withdrawn from the mold.

In testimony whereof I have signed my name to this specification.

CLIFFORD P. SPECK.